Nov. 20, 1962 H. J. OLSON 3,065,316
VALVE DEVICE ACTUATED BY FLUID FLOW
Filed Sept. 4, 1959
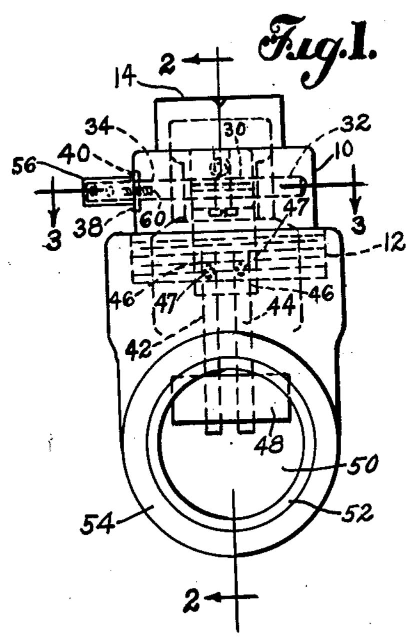
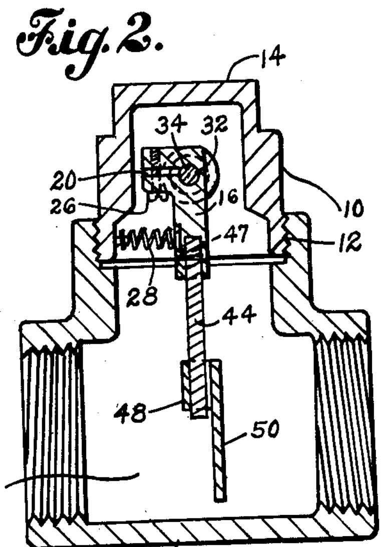
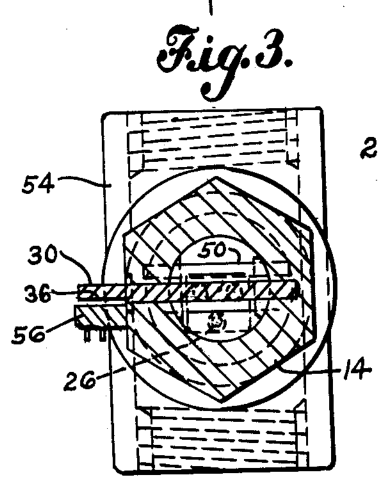
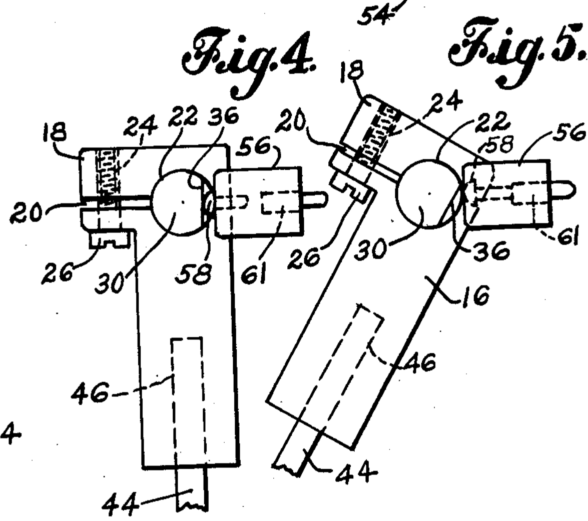
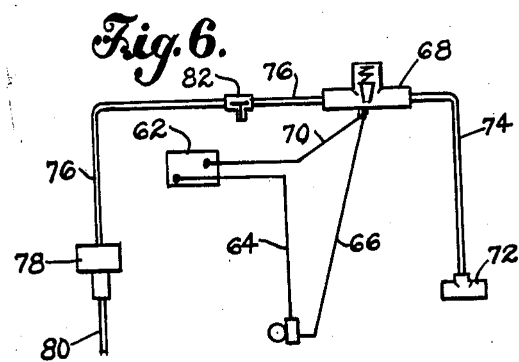
INVENTOR.
Harold J. Olson
BY Harold E. Cole
Attorney 3,065,316
Patented Nov. 20, 1962

3,065,316

VALVE DEVICE ACTUATED BY FLUID FLOW

Harold J. Olson, Broadway, Raynham, Mass.

Filed Sept. 4, 1959, Ser. No. 838,191
1 Claim. (Cl. 200—81.9)

This invention relates to a valve device that is actuated by the flow of fluid, such as oil, for instance.

One object of my invention is to provide a simplified valve actuating device that is actuated by the flow of liquid, and is adapted for connection to an automobile motor and associated parts whereby a vacuum line between a vacuum diaphragm and a motor manifold, will be automatically opened in response to the flow of a liquid to thus increase the speed of a motor that drives a fluid pump.

Another object is to provide such a device that has a connector within a housing that connects with a flap or leaf that is moved by flowing liquid, and also connects with a shaft that serves to close an electrical circuit when said connector moves it to operative position.

A further object is to provide such a device having so few parts and so simple in operation that it needs little service, and which the ordinary driver of a truck can provide.

The foregoing and other objects which will appear as the nature of the invention is better understood, may be accomplished by a construction, combination and arrangement of parts as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claim.

In the drawing:

FIG. 1 is a side elevational view showing my devices connected to a T-fitting.

FIG. 2 is a sectional view taken on the line 2—2 of FIG. 1.

FIG. 3 is a sectional view taken on the line 3—3 of FIG. 1.

FIG. 4 is a side elevational view of the connector for my device, showing it in normal or inoperative position, the coil spring attached thereto being shown broken away.

FIG. 5 is a side elevational view similar to FIG. 4; but showing the connector in operative position.

FIG. 6 is a wiring diagram showing the electrical system connecting my device to an automobile motor.

As illustrated, my device has a housing 10 having exterior screw-threads 12 at the lower part thereof and a closed top portion 14.

Movable within said housing 10 is a connector 16 having a boss portion 18 at the upper part thereof that has a lateral slit 20 that extends from the outside of said connector 16 to a shaft hole 22 through the latter. A screw-threaded hole 24 extends upwardly through said boss portion 18 that receives a screw 26. A tension spring 28 is preferably provided, which bears against said housing 10 and against said connector 16 to assure return of a shaft 30, later described, to normal position.

A shaft 30 passes through said connector hole 22, one end extending into a recess 32 in said housing and the other end passing through a hole 34 in the latter and beyond. Said shaft 30 has a flat or eccentric portion 36 outside said housing or said portion may be otherwise eccentrically shaped.

To fixedly hold said shaft 30 to said connector 16, said screw 26 is tightened, tending to close said slit 20 and thus hold the shaft in the connector so it rotates with the latter.

A recess 38 is provided in said housing 16 at the outside in which an O-ring seal 40 is pressed to prevent leaking around the shaft.

Two coil springs 42 and 44 extend into upwardly extending holes 46 in said connector 16 being held tight therein by pins 47, driven into the connector and between coils of said springs. The outer ends of said coil springs extend through holes in a boss 48 forming part of a flap or leaf 50 in a passage 52 in a T-fitting 54 through which oil or other liquid flows from a source of supply, such as an automobile truck, to the consumer's tank. Said housing screw-threadedly connects with said T-fitting 54.

A switch 56, having a switch control button 58, is attached to said housing 10 by a screw 60, being so positioned that there is a slight space between said button 58 and said flat portion 36 of the shaft. However, when said shaft is rotated it contacts said switch button 58 causing it to move into contact with a contact member 61, thereby closing an electrical circuit, later explained.

In operation, when the motor of a truck is idling; for instance, and connected to a pump, oil or other liquid may be pumped through said T-fitting 54. The flowing liquid moves said flap 50 to operative position, as shown in FIG. 5, and in turn said connector 16 and shaft 30 are rotated, which brings the shaft into contact with said switch button 58, thus closing an electrical circuit. Electrical current flows from a battery 62 through a wire 64 to said switch 56, thence through a wire 66 to a solenoid valve 68 which is opened by electrical current. Another wire 70 runs from the latter valve to said battery 62. Any other electrical source than a battery would be suitable, if it is conveniently located.

Upon the opening of said solenoid valve 68, a vacuum line is established from a vacuum manifold 72 connected to an automobile motor through tube 74 communicating with said valve 68 from which a tube 76 extends to, and communicates with a vacuum diaphragm 78 to which a throttle rod 80 is connected that actuates a throttle, not shown. This speeds the motor and thus the pumping operation.

When the flow of oil ceases said flap 50 returns to normal position, thus rotating said connector and shaft to normal position, the latter losing its contact with said switch button 58.

A well known vacuum breaker 82 in said tube 76 provides an air vent.

What I claim is:

A valve device comprising a housing having a recess extending laterally within said housing and a laterally extending hole through said housing, a connector in said housing having a hole extending laterally therethrough, a shaft rotatably extending into said recess and through said connector hole and rotatably through said housing hole and outside said housing and embodying an end portion outside said housing having an eccentric portion, an electrical switch outside of and attached to said housing embodying a switch button normally spaced from said shaft eccentric portion and adapted to be contacted by said shaft when said eccentric portion passes beyond said button upon rotation of said shaft, a movable member and another member attached to said connector and to said movable member whereby movement of the latter rotates said connector and shaft to move said shaft end portion into contact with said switch button, said housing embodying a boss portion having a slit therethrough in communication with said connector lateral hole, a hole in said boss portion having a threaded portion, a screw in said threaded portion hole and extending through said slit and holding said shaft fixedly in said connector lateral hole.

References Cited in the file of this patent

UNITED STATES PATENTS

| | | |
|---|---|---|
| 1,959,634 | Mickle | May 22, 1934 |
| 2,293,574 | Teach et al. | Aug. 18, 1942 |
| 2,403,938 | Macan | July 16, 1946 |
| 2,421,768 | Voliazzo et al. | June 10, 1947 |
| 2,611,044 | Siemon | Sept. 16, 1952 |
| 2,852,635 | Reed | Sept. 16, 1958 |